United States Patent [19]

Robinson et al.

[11] 4,213,150

[45] Jul. 15, 1980

[54] REAL-TIME EDGE PROCESSING UNIT

[75] Inventors: Guner S. Robinson, Los Angeles; James J. Reis, La Palma, both of Calif.

[73] Assignee: Northrop Corporation, Los Angeles, Calif.

[21] Appl. No.: 898,970

[22] Filed: Apr. 21, 1978

[51] Int. Cl.[2] .............................................. H04N 5/14
[52] U.S. Cl. .................................................... 358/166
[58] Field of Search ................ 358/96, 162, 166, 167, 358/37; 340/146 AE

[56] References Cited

U.S. PATENT DOCUMENTS

| | | | |
|---|---|---|---|
| 3,621,129 | 11/1971 | Fisher | 358/166 |
| 3,641,268 | 2/1972 | Beck | 358/166 |
| 3,988,602 | 10/1976 | Gorsica | 358/166 |
| 4,074,231 | 2/1978 | Yajima et al. | 340/146.3 MA |

OTHER PUBLICATIONS

Robinson et al., "Detection and Coding of Edges Using Directional Masks", *Spie vol. 87, Advances in Image Transmission Techniques* (1976), pp. 117–125.

*Primary Examiner*—John C. Martin
*Attorney, Agent, or Firm*—Edward A. Sokolski

[57] ABSTRACT

A digital machine for detecting and processing pictorial edges in video data. The invention mechanizes, in parallel, three different processing techniques, the outputs of which are combined in a selectable manner to generate processed and enhanced video data. The first parallel processor convolves four inter-related 3×3-element masks with the 2-dimensional video input data to locate the pictorial edges, to determine the edge directions, to execute edge connectivity logic, and to calculate certain edge statistics. The second parallel processor implements a 3×3 element, low or high pass image filter, and an adaptive threshold filter. Both the first and the second parallel processors use Fast-Form algorithms which allow data processing in real time with a minimum of components. The third parallel processor operates on the video data in serial form to generate the video output from the edge processing unit. The third processor is interconnected with the first two processors so as to process and enhance selected features of the serial video data in accord with the outputs from the first two processors.

4 Claims, 7 Drawing Figures

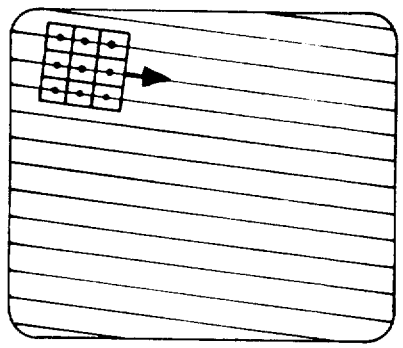
FIG. 2
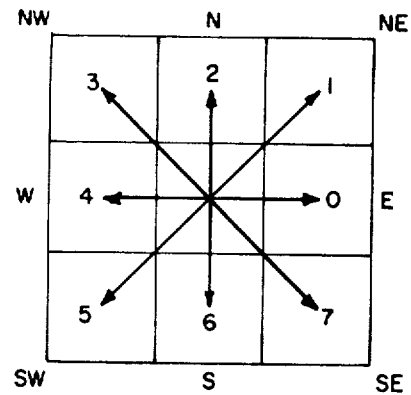
FIG. 4
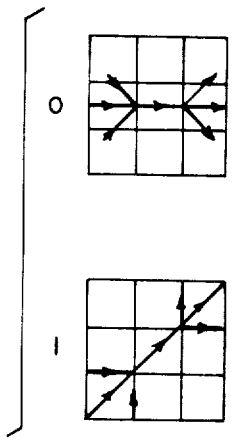
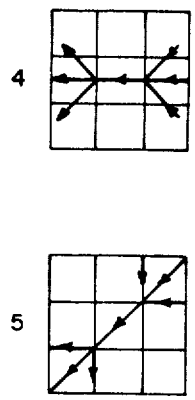
FIG. 7
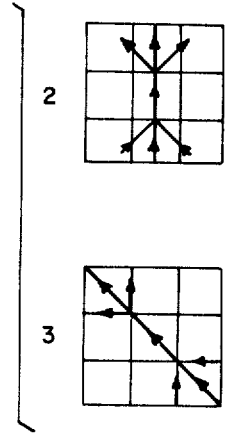

REAL-TIME EDGE PROCESSING UNIT

BACKGROUND OF THE INVENTION

1. Field of the Invention

This invention relates to real time, two-dimensional video data processing. In particular, it relates to pictorial edge detection and processing systems.

2. Description of the Prior Art

Digital machines have been used to select and expand the dynamic range of selected grey levels within video data. See e.g., U.S. Pat. No. 3,988,602. Digital machines have also been used to normalize the background brightness level in video data, to identify and select features according to their grey level relative to a local background, (U.S. Pat. No. 3,621,129), and to normalize the brightness level of each picture element with respect to the average brightness of the surrounding pictorial elements (U.S. Pat. No. 3,996,421). A few machines of the prior art operate in real time.

SUMMARY OF THE INVENTION

This invention operates in real time to identify pictorial edges in two-dimensional video data, to expand the dynamic range of pre-selected grey levels, and to process video data by means of two-dimensional low and high-pass filters; all for the purpose of generating video displays wherein selected types of pictorial features are processed and emphasized.

The invention mechanizes a fast form of the convolution of four inter-related 3×3 directional masks with two-dimensional video data to calculate gradients in each of 8 quantized directions. The gradient data is used to identify and describe pictorial edges. The pictorial edges are identified and processed by the application of edge-connectivity logic. The edge data, together with data from a two-dimensional filter and an adaptive threshold are used in this invention to enhance the input video data so as to select and display prominently certain of the pictorial features.

BRIEF DESCRIPTION OF THE DRAWINGS

FIG. 2 is an illustration of the relationship between the 3×3 array of picture elements generated by the window generator, and the raster scan from the video camera;

FIG. 4 illustrates the relationship between the 3×3 array of picture elements and the eight quantized directions which are used to describe the edge directions;

FIG. 7 illustrates the directional relationships which must be satisfied by edges in adjacent picture elements in order to satisfy 3-point edge connectivity requirements.

DETAILED DESCRIPTION

This invention, the real-time edge processing unit ("EPU"), is a generalized edge processing machine. The EPU processes two-dimensional video data at data rates greater than 1.5 giga-bits per second. These fast data rates are achieved by parallel processing 3×3 blocks of data by means of two fast-form two-dimensional transversal digital filters. One of these filters realizes a gradient function while the second realizes either a two-dimensional low pass or high pass filtering function. The outputs of the two filters are further modified and combined in a variety of ways to mechanize a multitude of edge-oriented processes. The overall block diagram of the edge processing unit is illustrated in FIG. 1.

Figure 1:
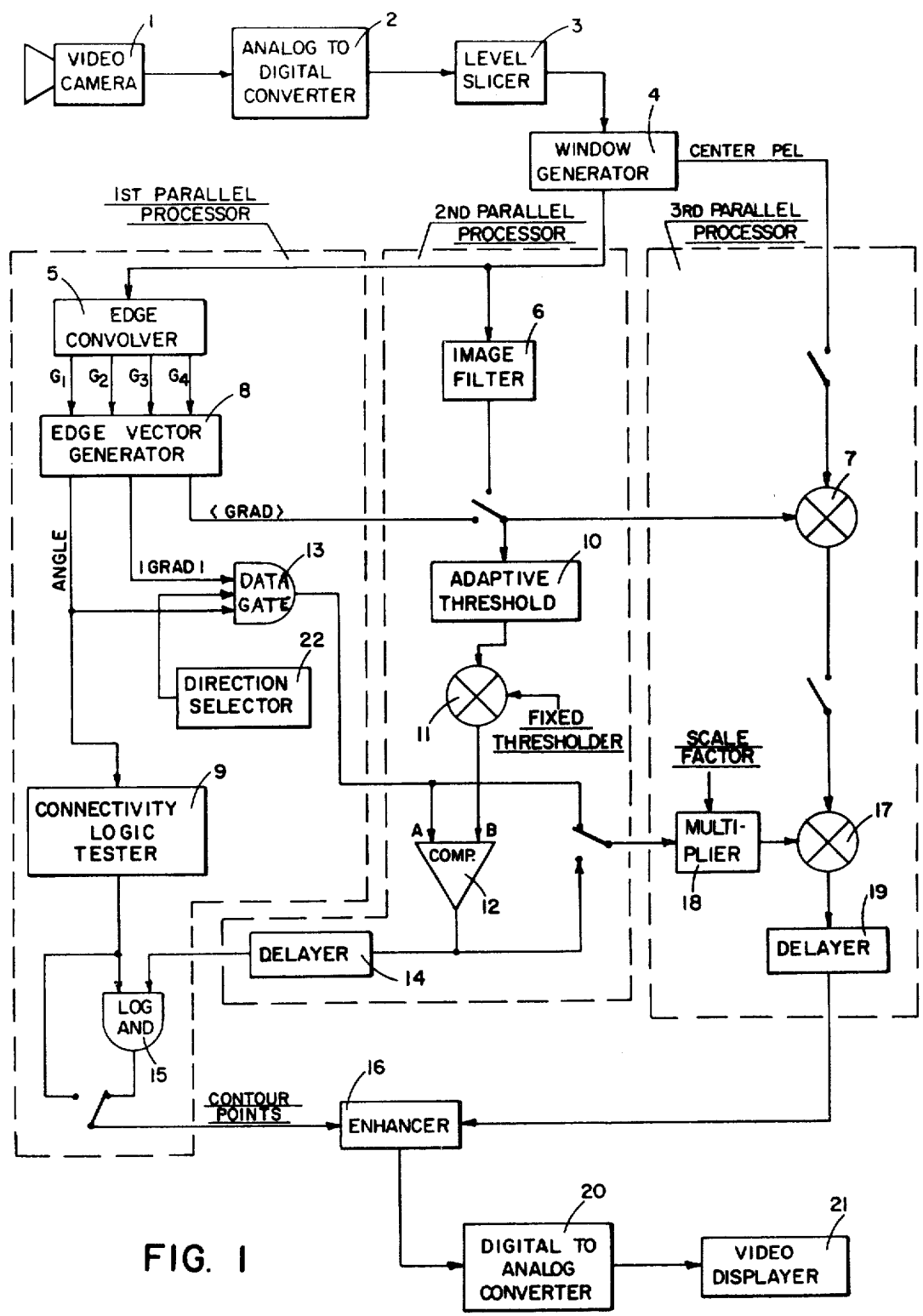
FIG. 1 is a block diagram of the real-time edge processing unit.

Referring to FIG. 1, video data which has been generated in analog form by the raster scan of video camera 1, is input to the analog to digital converter 2, where it is quantized in both amplitude and time, thereby creating a one-dimensional sequential source of digital data. The sampling rates vary from 5 to 10 mHz for most applications, and the number of quantized amplitude levels varies from 64 to 256 levels per sample. The output from the analog to digital converter 2 enters the level slicer 3, wherein selected ranges of grey levels are expanded in dynamic range. A level slicer suitable for use in this invention is described by W. K. Pratt in "Digital Image Processing", Wiley, New York, 1978. After leaving the level slicer 3, the video data then enters the 3—3 window generator 4.

The window generator 4 converts the one-dimensional sequence of digital data to a two-dimensional 3×3 element '7 window" containing 9 adjacent picture elements ("PELs"), as illustrated in FIG. 2. Referring again to FIG. 1, the 3×3 array of picture elements is input both to the edge convolver 5 and to the two-dimensional image filter 6. The window generator 4 also supplies the center picture element of the 3×3 array to the summer 7. Thus, the window generator provides inputs to each of three parallel processors, which processors are indicated by the dotted lines in FIG. 1. These 3 processors are interconnected in any of a number of ways to implement a wide range of processing schemes.

FIRST PARALLEL PROCESSOR

Fast-Form Convolver

Figure 3:
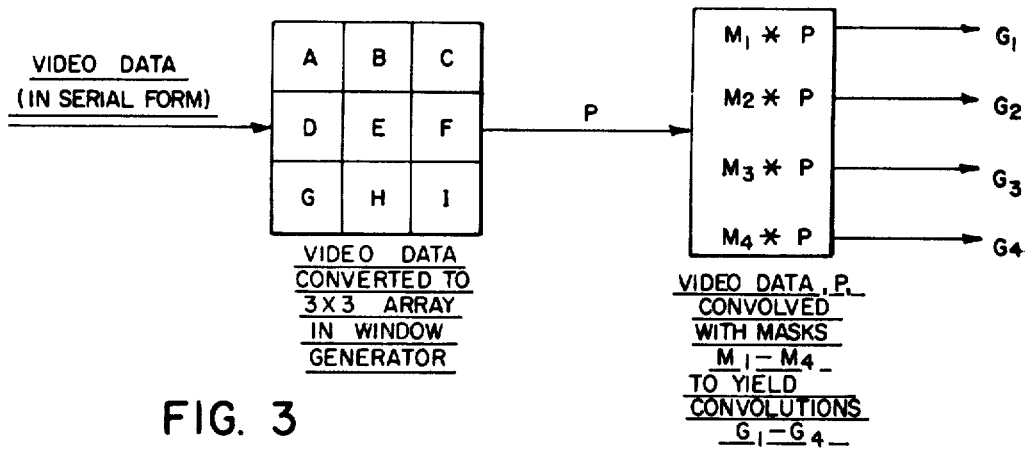
FIG. 3 portrays the relationship between the picture elements in the 3×3 array generated by the window generator, the masks M1–M4 and the convolutions, G1–G4, of the 3×3 array with the masks.

FIG. 3 illustrates the operation of the window generator 4 and the edge convolver 5. The video digital data, in one-dimensional sequential form, from the level slicer is converted into a two-dimensional, parallel access, 3×3 array by the window generator. The 3×3 array of picture elements labeled "A" through "I" in FIG. 3 are convolved in edge convolver 5 with the masks labeled "M1 through M4" to yield the convolutions labeled "G1" through "G4". M1–M4 are the following matrixes:

$$M1 = \begin{bmatrix} 1 & 2 & 1 \\ 0 & 0 & 0 \\ -1 & -2 & -1 \end{bmatrix}$$

$$M2 = \begin{bmatrix} 2 & 1 & 0 \\ 1 & 0 & -1 \\ 0 & -1 & -2 \end{bmatrix}$$

$$M3 = \begin{bmatrix} 1 & 0 & -1 \\ 2 & 0 & -2 \\ 1 & 0 & -1 \end{bmatrix}$$

$$M4 = \begin{bmatrix} 0 & -1 & -2 \\ 1 & 0 & -1 \\ 2 & 1 & 0 \end{bmatrix}$$

As depicted in FIG. 4, the masks, M1 through M4, measure the gradients in the "N", "NW", "W", and "SW" directions respectively, with respect to the 3×3 array of video data. Because the convolution of a given set of video data with the mask M1, which corresponds to a "North" gradient, is just the negative of the convolution with the "South" gradient, and because similar asymmetries exist for the remaining quantized directions, only the four masks M1–M4 must be convolved by the edge convolver 5 to obtain the gradient components in all eight directions.

Figure 5:
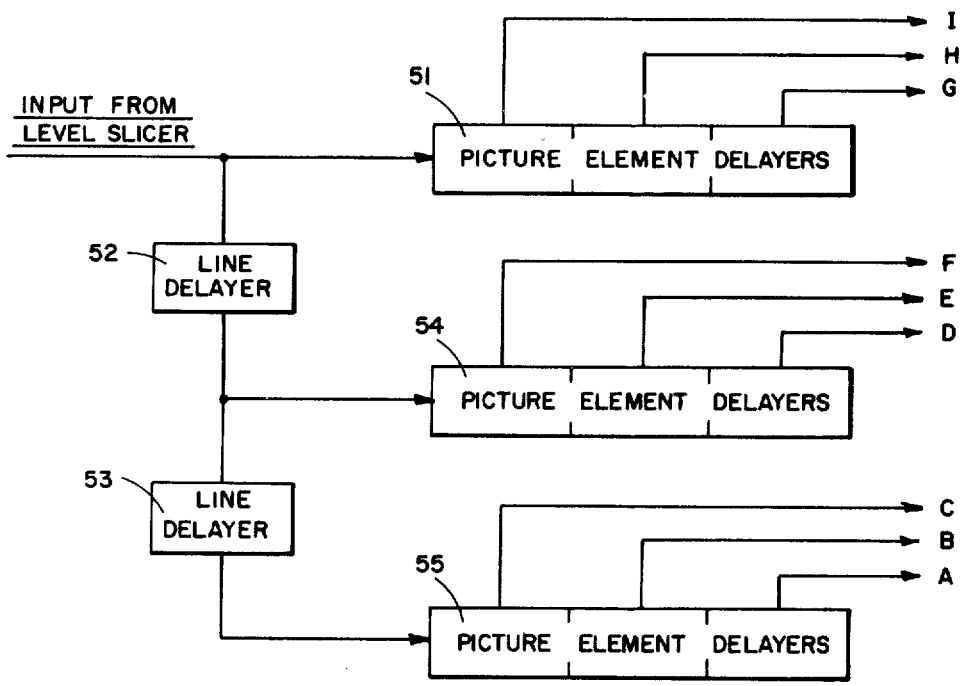
FIG. 5 is a block diagram of the window generator.

FIG. 5 illustrates in more detail the operation of the window generator 4. The input from the level slicer 3 is delayed by a sequence of element delayers 51, each of which insert a delay corresponding to the time delay between the sampling of adjacent picture elements. Outputs from the sequence of element delayers provide the picture elements labeled G, H, and I in FIG. 3. The output from the level slicer 3 is also input into a line delayer 52, which inserts a delay corresponding to one horizontal scan of the video camera raster. The output of the line delayer 52 feeds a sequence of three element delayers 54 to generate the picture elements labeled F, E, and D. The output of the line delayer 52 feeds a second line delayer 53, which in turn feeds a third sequence of three element delayers 55 to yield picture elements A, B, and C.

Figure 6:
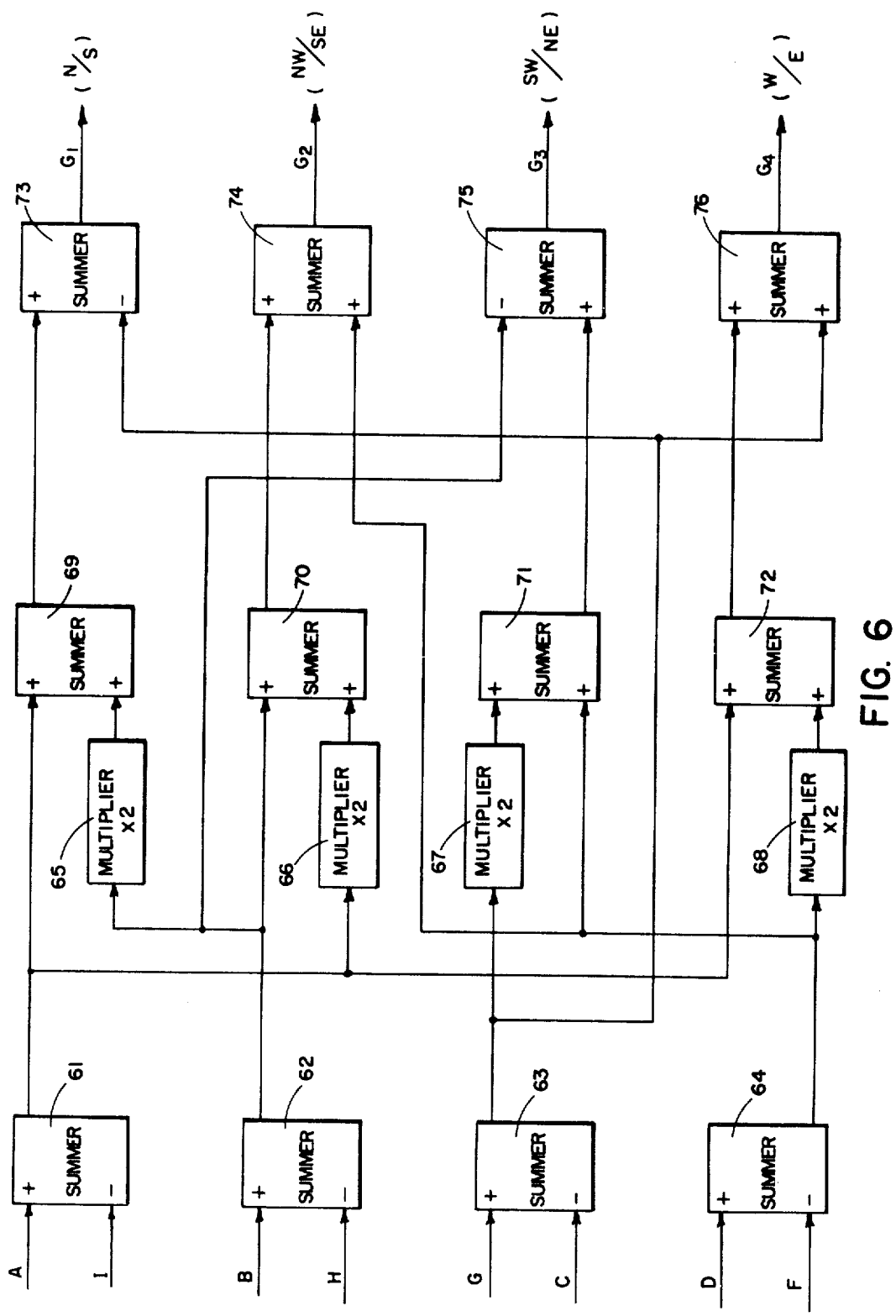
FIG. 6 is a block diagram of a fast-form of the edge convolver.

The block diagram in FIG. 6 illustrates the mechanization of the edge convolver 5 in a fast-form which permits execution of the convolution in real time with a minimum of elements. As shown in FIG. 6, the picture elements A through I from the window generator 4 feed into four summers 61–64. The outputs of the summers 61–64 are fed through multipliers 65–68 into summers 69–72. The multipliers 65–68 multiply the data by the factor of 2 through application of a one place left-shift. The outputs from summers 61–64 are also fed directly to summers 69–72 and summers 73–76 with appropriate inversions of sign as indicated. The outputs of summers 73–76 are the four convolutions, G1–G4, of the masks, M1–M4, with the pictorial data. The image filter 6 is mechanized in a "fast form" in a similar fashion.

The convolutions, G1–G4, from the edge convolver 5 are input to the edge vector generator 8. The edge vector generator 8 compares the absolute magnitudes of the four convolutions, G1–G4 and selects the largest which is output from edge vector generator 8 as |GRAD|. The largest convolution defines the edge direction (with a 180° directional ambiguity), and the sign of the largest convolution resolves the directional ambiguity. A three-bit, binary number which represents the edge direction is output as "ANGLE" in accord with the numbering system shown in FIG. 4. The edge vector generator 8 also calculates the average gradient magnitude in accord with the following equation:

$$<GRAD> = \frac{1}{4} \sum_{i=1}^{4} |G_i|$$

The edge vector generator 8 feeds the edge direction information to the connectivity logic tester 9. The connectivity logic tester 9 first generates a 3×3 array of edge direction data for the adjacent picture elements in a manner similar to that of the window generator 4. The connectivity logic tester 9 then applies connectivity logic to the angle data for the adjacent picture elements within the 3×3 window.

FIG. 7 illustrates the 72 permissible conditions for three-point connectivity as set forth by G. S. Robinson in "DETECTION AND CODING OF EDGES USING DIRECTIONAL MASKS", Proceedings of the SPIE Conference on *Advances in Image Transmission Techniques*, San Diego, California, August 1976, Pages 117–125. The vectors in FIG. 7 are drawn parallel to the pictorial edges. As illustrated in FIG. 7, the edge direction associated with the central picture element determines the two adjacent picture elements that are to be examined. If the edge directions associated with each of the two adjacent picture elements each lie within ±45° of the direction of the central element, the connectivity condition is satisfied. Accordingly, the machine determines that a connected edge exists at this point in the data. Less stringent connectivity requirements can instead be used. For instance, the connectivity logic tester can require that the direction associated with only one of the two adjacent picture elements need agree within ±45° of the direction of the central picture element in order to conclude that an edge connectivity exists. Other possible connectivity criteria also are described in ROBINSON, supra. The output of the connectivity logic tester 9 is applied to the enhancer 16, either directly or selectively through the logical AND 15.

SECOND PARALLEL PROCESSOR

Referring again to FIG. 1, the window generator 4 also provides a 3×3 array of picture elements to the two-dimensional image filter 6. The image filter convolves either a low-pass mask or a high-pass mask with the 3×3 array of picture elements in a manner similar to that of the convolver 5. The low-pass filter is mechanized by a mask as $$M_0 = (1/16) \begin{bmatrix} 1 & 2 & 1 \\ 2 & 4 & 2 \\ 1 & 2 & 1 \end{bmatrix}$$

The high-pass operation is mechanized by a mask such as the Bi-Laplacian mask:

$$\nabla^4 = \begin{bmatrix} 1 & -2 & 1 \\ -2 & 4 & -2 \\ 1 & -2 & 1 \end{bmatrix}$$

Whenever selected, the output of the average gradient from the edge vector generator 8 or the output from the image filter 6 can be added to the center picture element in the summer 7 to emphasize certain features in the video data. The output of the average gradient from the edge vector generator 8 and the output from the image filter 6 each also can be selected and applied to the adaptive thresholder 10. The adaptive thresholder 10 generates a variable threshold dependent upon prior input data, which variable threshold is added to a fixed but selectable threshold in summer 11 whose output is then compared in comparator 12 with the output of the data gate 13. The fixed threshold, alone, may be input to comparator 12. Alternatively, both the adaptive thresholder 10 and the fixed threshold can be combined in summer 11 and input to comparer 12. Only those gradient values which correspond to the edge directions selected by the operator and keyed into direction selector 22 by means of toggle switches are allowed to pass through data gate 13. Data gate 13 compares the direction of the edge, as represented by the "ANGLE" data, with those directions input by the generator by the direction selector 22. When the edge direction is one of those enabled by the operator, the data gate 13 is opened to pass the absolute magnitude of the edge through to comparer 12. The comparer 12 generates an output of a "logical 1" whenever the output of data gate 13 exceeds the output of summer 11, and this output passes through delayer 14 and then is combined logically in logical AND 15 with the output of connectivity logic tester 9. The delayer 14 and delayer 19 insert a delay in the data streams passing through the second and third parallel processors which is equal to the delay introduced by the window generator contained in the connectivity logic tester 9. When selected, the output of logical AND 15 is input to enhancer 16 to brighten those picture elements in the output display for which the selected connectivity conditions, the direction of the gradient, and the threshold requirements are met.

THIRD PARALLEL PROCESSOR

Referring again to FIG. 1, the center picture elements from the window generator 4 are summed in summer 7 with the average gradient from the edge vector generator 8 or with the output of the image filter 6 whenever these are selected. The output of summer 7, when selected, is summed in summer 17 with the output of data gate 13 or with the output of comparer 12 following multiplication by a scale factor in multiplier 18. The center picture elements from window generator 4 which pass through summer 7, summer 17 and delayer 19 to the enhancer 16 are selectively increased or decreased in brightness by the enhancer whenever the connectivity requirements are satisfied. The output of the enhancer 16 is converted to an analog signal by the digital to analog converter 20, and is then displayed in output display 21.

The multiple switching arrangements illustrated in FIG. 1 allow significant modification of the operational characteristics of the edge processing unit. Thus, a wide range of processing schemes accordingly can be mechanised and tested in the edge processing unit.

We claim:

1. A system for processing video data in digital form to identify and enhance pictorial edges comprising:
   a. window generator means for operating on the input video data for generating digital data in parallel form which represents a sequence of 3×3 arrays of picture elements, and generating digital data representing a sequence of picture elements at the centers of the 3×3 arrays,
   b. two parallel processing means comprising one parallel processor means for operating on the digital data, which represents the sequence of 3×3 arrays of picture elements, to identify and locate pictorial edges within the sequence of 3×3 arrays by means of edge sensitive masks and connectivity requirements, and another parallel processor means for operating on the digital data representing the sequence of center picture elements for introducing a time delay in the data equal to the time delay introduced by the first parallel processing means,
   c. enhancer means for receiving the outputs of the two parallel processor means and selectably increasing or decreasing the magnitude or brightness of the center picture elements as represented by the digital data output from the second of the two parallel processor means, in response to the output from the first of the two parallel processor means.

2. A system for processing video data in digital form to identify and enhance pictorial edges comprising:
   a. window generator means for operating on the input video data for generating digital data in parallel form which represents a sequence of 3×3 arrays of picture elements, and for generating digital data representing a sequence of picture elements at the centers of the 3×3 arrays,
   b. edge convolver means for receiving and convolving the data, which represents the 3×3 arrays of picture elements, with 3×3 masks to compute gradients in each of four quantized directions,
   c. edge vector generator means for logically operating on the output of the edge convolver means for generating edge vector data describing the edge angle, the absolute value of the gradient, and the average of the absolute magnitudes of the gradients in the quantized directions,
   d. data gate and direction selector means for operating on the output of the edge vector generator means for selecting and passing edge data corresponding to selectable edge directions,
   e. connectivity logic tester means for logically operating on the data from the edge vector generator means, which data corresponds to adjacent picture elements, for determining the existence of connected pictorial edges and generating digital data representing the existence or absence of such connected edges,
   f. image filter means for operating on the output from the window generator means for filtering the data representing the 3×3 arrays of picture elements through a selectable high or low pass filter,
   g. comparer means for comparing the output of the data gate and direction selector means with a fixed threshold and generating an output when the input from the data gate and direction selector means is the greater of the two inputs,
   h. first delayer means for delaying in time the output from the comparer means,
   i. logical AND means for operating on the output of the connectivity logic tester means and the output of the first delayer means for generating an output in logical accordance with the inputs,
   j. first summer means for selectably operating on the data output from the window generator means, which represent the center picture elements, and selectably operating on either the output of the image filter means or the average gradient data output from the edge vector generator means for generating an output which represents the sum of the inputs,
   k. second summer means for operating selectably on the output of the first summer means and selectably on the multiplied output from the data gate and direction selector means for generating an output which represents the sum of the inputs,
   l. second delayer means for delaying in time the output of the second summer means, m. enhancer means for receiving the outputs of the logical AND means and the output from the second delayer means and selectably increasing or decreasing the magnitude or brightness of the center picture elements as represented by the digital data output from the second summer means, in response to the output from the logical AND means.

3. The system of claim 2 wherein the edge convolver means and the image filter means are both of the fast-form type.

4. The system of claims 1 or 2 or 3 and additionally comprising level slicing means for receiving the input video data and expanding in dynamic range selectable ranges of input data and outputting the expanded data to the window generator means.

* * * * *